United States Patent [19]

Chuchanis

[11] Patent Number: 4,863,360
[45] Date of Patent: Sep. 5, 1989

[54] BAG CONTROL MECHANISM FOR TIRE PRESS

[75] Inventor: Theodore Chuchanis, Canton, Ohio

[73] Assignee: Rogers Industrial Products, Medina, Ohio

[21] Appl. No.: 144,793

[22] Filed: Jan. 15, 1988

[51] Int. Cl.⁴ ............................................. B29C 35/04
[52] U.S. Cl. ..................... 425/48; 264/315; 425/33; 425/42; 425/43; 425/50; 425/52; 425/58
[58] Field of Search ................. 425/23, 27, 29, 33, 425/40, 42, 43, 48, 49, 50, 52, 58, 389, 390; 264/315

[56] References Cited

U.S. PATENT DOCUMENTS

| | | | |
|---|---|---|---|
| 2,846,722 | 8/1958 | Soderquist | 425/42 |
| 3,329,748 | 7/1967 | Hugger | 425/42 |
| 3,887,313 | 6/1975 | Jaedicke et al. | 425/43 |
| 3,976,409 | 8/1976 | Athey | 425/48 |
| 4,338,069 | 7/1982 | Singh et al. | 425/38 |
| 4,527,946 | 7/1985 | Singh et al. | 425/58 |
| 4,684,338 | 8/1987 | Steidl et al. | 425/52 |

FOREIGN PATENT DOCUMENTS

| | | | |
|---|---|---|---|
| 57-39943 | 3/1982 | Japan | 425/48 |
| 61-57314 | 3/1986 | Japan | 425/50 |

*Primary Examiner*—James Housel
*Attorney, Agent, or Firm*—Oldham & Oldham Co.

[57] ABSTRACT

A bag control mechanism (or center mechanism) for a tire press in which cross flow of curing medium from the inlet to the outlet is prevented. The center mechanism includes a cylindrical casing having a piston rod reciprocable therein, and an annular fluid distribution member comprising a hub and a distribution cap at the upper end of the casing. The hub has a central bore of larger diameter than that of the piston rod, and inlet and outlet passageways for a curing medium, on opposite sides of the bore. The hub may also have passageways which permit sensing of a condition such as temperature within the tire press. The hub also has lateral passageways from the bore to the outlet passageway, and from the outside surface of the hub to the outlet passageway. The inlet passageway is separated from the bore by a portion of the hub's body. The distribution cap has an opening or passageway aligned with the inlet passageway of the hub, and a cut-out portion aligned with the outlet passageway of the hub. By interposing a wall between the inlet passageway and the bore, cross flow of curing medium from the inlet to the outlet is prevented, and the entire quantity of curing fluid is directed into the interior space of the tire press bag or bladder. This contruction assures substantially less temperature variation within the tire press than is the case in conventional tire presses, resulting in a more even cure of the tire.

11 Claims, 5 Drawing Sheets

BAG CONTROL MECHANISM FOR TIRE PRESS

TECHNICAL FIELD

This invention relates to bag control mechanisms for tire presses.

BACKGROUND ART

Bag control mechanisms, which are also known as center mechanisms, are used to position a green tire in a tire press or mold, and to provide for the admission and removal of a fluid curing medium. A fluid curing medium may be either a gas, such as steam or a mixture of steam and inner gas, or may be a liquid such as hot water under elevated pressure. A center mechanism typically comprises a cylindrical casing having a fluid actuated piston and piston rod reciprocal therein, a hub having inlet and outlet passageways for curing medium extending therethrough, and a distribution cap or gland which is placed atop the hub. The center mechanism also includes two sets of clamping rings for clamping the ends of a flexible bag or bladder in place. One set of clamping rings (typically the upper set) is typically supported on the piston rod and reciprocates therewith. The other set of clamping rings (typically the lower set) is typically supported on the hub and is stationary. Representative mechanisms are shown in U.S. Pat. No. 3,976,409 to Athey, and in U.S. Pat. No. 4,338,069 to Singh et al. (see especially FIG. 9).

Curing medium is introduced through the hub inlet passageway into the interior space of the bag or bladder, as is well known in the art. Suitable operating cycles are well known; typically, curing medium is supplied at a slight superatmospheric pressure in order to shape the bag, so that it is in contact with the inside surface of a green tire, after which the curing medium is supplied at full curing temperature pressure. Curing medium is exhausted through the outlet passageway in the hub. Suitable operating cycles are described for example in the aforementioned U.S. Pat. Nos. 3,976,409 and 4,338,069, and so will not be described in further detail here.

Presently known center mechanisms have two problems in operation. First and foremost, there is an appreciable variation in temperature between different points within the tire press. This variation may be appreciable, for example, about 7° F. (or approximately 4° C.) between the hottest and coolest portions of the tire press. Typically the upper portion is hotter; condensate (when steam is used) tends to cool down the lower set of bladder clamp rings. This temperature variation results in uneven cure of the tire, since the cure rate is quite sensitive to temperature. Another problem is that curing medium is inefficiently utilized. Both problems stem from the same cause, which is improper design of the fluid inlet and outlet in the hub. Present designs permit cross flow of curing medium from the inlet to the outlet, so that not all of the curing medium is introduced into the interior space of the bladder, and with the further result that the aforesaid temperature variations may occur.

DISCLOSURE OF THE INVENTION

An object of the present invention is to provide an improved bag control or center mechanism for tire presses, in which cross flow of curing medium from inlet to outlet is prevented. Related objects are to improve the utilization of curing medium, and to reduce appreciably the temperature variations within a tire press.

This invention provides a center mechanism for a tire press, which mechanism comprises:
(a) an essentially vertical cylindrical casing having a rod reciprocable therein; and
(b) an annular fluid distribution member at the upper end of said casing, said distribution member having:
 (1) a central bore extending vertically therethrough and surrounding a portion of said rod;
 (2) spaced inlet and outlet passageway means for a fluid curing medium extending therethrough, said passageway means being spaced from said bore;
 (3) imperforate wall means between said inlet passageway and said bore, said wall means extending the entire length of said bore for preventing cross flow of curing medium from said inlet passageway to said outlet passageway; and
 (4) lateral passage means between said bore and said outlet passageway for permitting curing medium to flow from said bore to said outlet passageway.

BRIEF DESCRIPTION OF THE DRAWINGS

This invention will now be described with reference to the accompanying drawings, in which.

BEST MODE FOR CARRYING OUT THE INVENTION

This invention will now be described in detail with particular reference to a first and preferred embodiment of this invention, in which steam and an inert gas are used as curing media. This embodiment will be described with particular reference to FIGS. 1–4.

Referring now particularly to FIGS. 1, 3 and 4, 20 is a center mechanism (or bag control mechanism) according to a preferred embodiment of this invention. Center mechanism 20 comprises an essentially vertical hollow cylindrical casing 22, which is closed at its lower end by an end cap 24 having therein a slot 26 for insertion of a tool (not shown) for lifting casing 22. Casing 22 is slidably received in stationary cylinder guide 28, which is a sleeve. Spaced rings 30, which are thin bands of metal (e.g. bronze) received in recesses in guide 28, facilitate sliding movement of casing 22 within guide 28.

Figure 1:
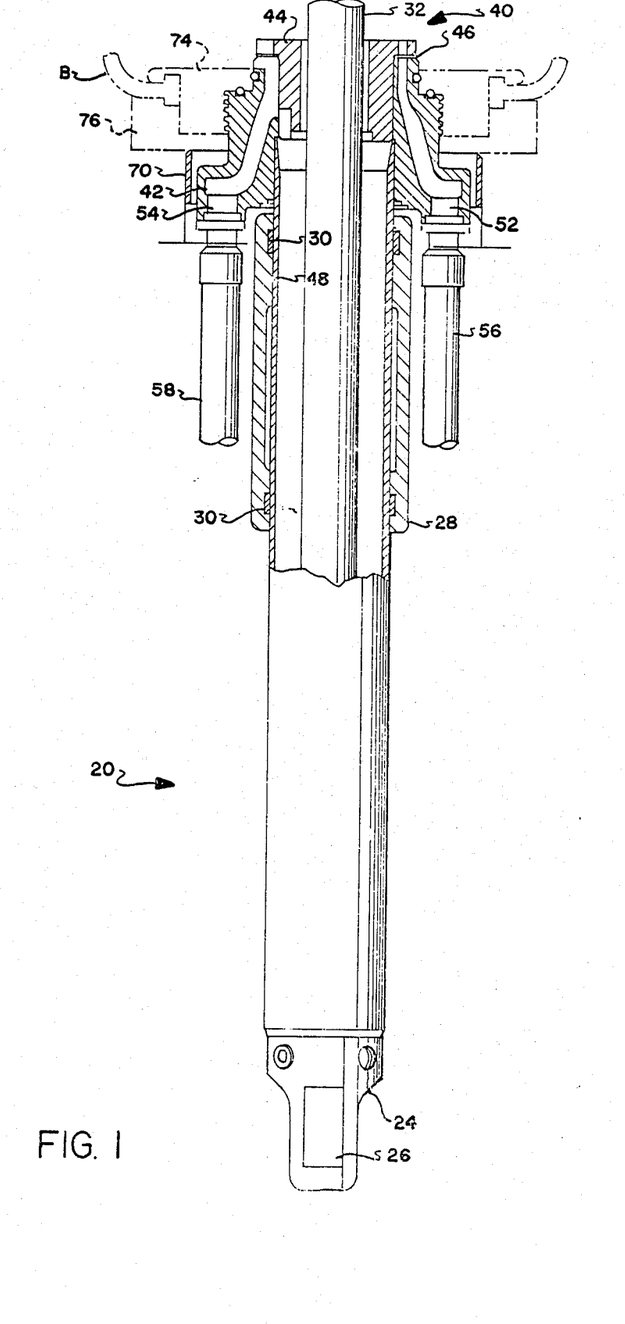
FIG. 1 is a vertical sectional view, taken along line 1—1 of FIG. 3, of an apparatus according to a first embodiment of this invention. This embodiment is particularly suitable when a gaseous curing medium is to be used.

A vertically reciprocable piston rod 32 is mounted for vertical movement within casing 22. Movement of the piston rod may be controlled by a fluid actuation system and a piston head (not shown) at the lower end of the piston rod. Thus, piston rod 32 is movable relative to casing 22. Piston rod 32 is preferably hollow, with a central supply pipe 33 to provide fluid for lowering of the piston head (not shown).

Supported at the upper end of piston rod 32 are means for clamping one end (i.e. the upper end) of a bag or bladder B. These means, shown in FIG. 10 (but not in FIG. 1) typically compriswe a first set of clamping rings 34 and 36.

An annular fluid distribution member or assembly 40 is mounted at the upper end of casing 22. This distribution member or assembly comprises an annular hub 42, a distribution cap or gland 44 in the shape of a flanged sleeve, and a gasket 46 which is interposed between the top of the hub 42 and the mating surface of the distribution cap 44.

Hub 42 has a central bore 48 extending vertically therethrough. This bore preferably has two portions of different diameters, the upper portion having a slightly smaller diameter than the lower portion so as to provide a shoulder which rests on the upper end of cylindrical casing 22. Hub 42 preferably has three portions of different outside diameters. Thus, the outside surface 50 has a lower portion, which is the portion of largest diameter, a middle portion which is at least partially screw threaded, and a top portion, which is the portion of smallest diameter.

Hub 42 has an inlet passageway 52 and an outlet passageway 54, for supply and withdrawal (or draining), respectively, of a fluid (preferably gaseous) curing medium. These passageways are connected to supply pipe 56 and drain pipe 58, respectively. Inlet passageway 52 and outlet passageway 54 both extend from the top to the bottom of hub 42. These passageways have quite different configurations, as will now be described in detail.

The lowest portion of inlet passageway 52, adjacent to the bottom of hub 42, is preferably a port of cylindrical (or alternatively frustoconical cross section. The middle portion extends upwardly at a slight angle to the vertical, and may be of oblong cross section. Finally, top portion of passageway 52 is preferably in the form of an arcuate slot which is spaced from the bore hole 48. Spacing is provided by a portion of hub 42, which forms a solid imperforate wall (or wall means) 60. Passageway 52 terminates in an opening at the top of hub 42, where it communicates aligned passageways or openings in distributor cap 44 and gasket 46 as will be subsequently described. While the upper portion of inlet passageway 52 is in the form of an arcuate slot, other shapes, e.g. cylindrical of circular cross section, may also be used.

Wall 60 directs all of the curing medium flowing through inlet passageway 52 to be directed upwardly into the interior space of bladder B, and prevents cross flow of fluid from inlet passageway 52 to outlet passageway 54. This results in the advantages of less temperature variation within the tire press, and better utilization of curing medium, as has been described above.

The upper portion of hub 42 adjacent to outlet passageway 54 is quite different from the upper portion adjacent to inlet passageway 52. As seen most clearly in FIG. 3, there is no wall between bore 48 and outlet passageway 54; instead, the portion of hub 42 between bore 48 and the upper portion of outlet passageway 54 is cut away to form a first lateral passageway 62. A second lateral passageway 64, extending from the exterior surface 50 of hub 42 to outlet passageway 54, is provided at the top of hub 54. This passageway is also formed by cutting away a portion of hub 42. The middle and lower portions of outlet passageway 54 may have configurations similar to those of the corresponding portions of inlet passageway 52. Lateral passageway 62 (and a mating cutout portion in distribution cap 44 to be described subsequently) permit flow of curing fluid from the interior of bladder B to outlet passageway 54. Lateral passageway 64 permits draining of any fluid, especially fluid (e.g. water) which leaks by the piston head. Such drainage takes place when the piston and piston rod 32 approach the top of their stroke.

Figure 3:
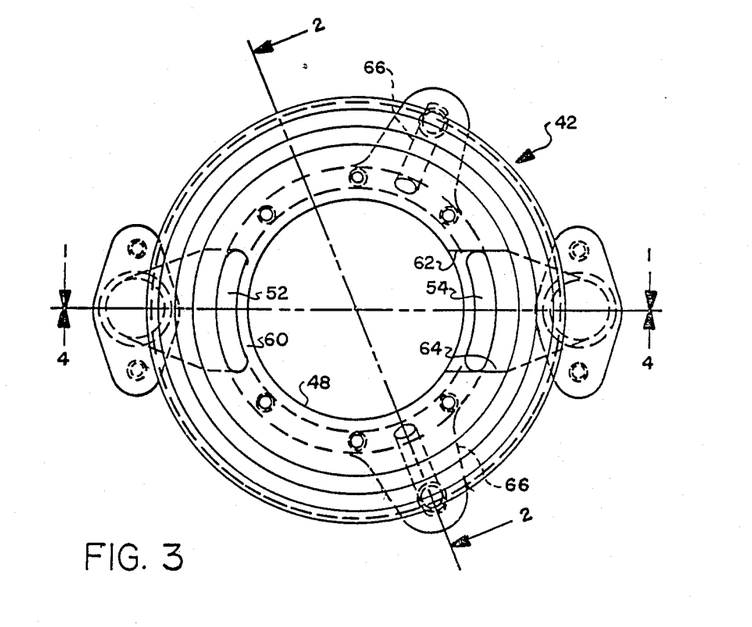
FIG. 3 is a top plan view of the hub apparatus of the first embodiment.

Inlet passageway 52 and outlet passageway 54 are diametrically opposite each other, on opposite sides of bore 48.

Figure 2:
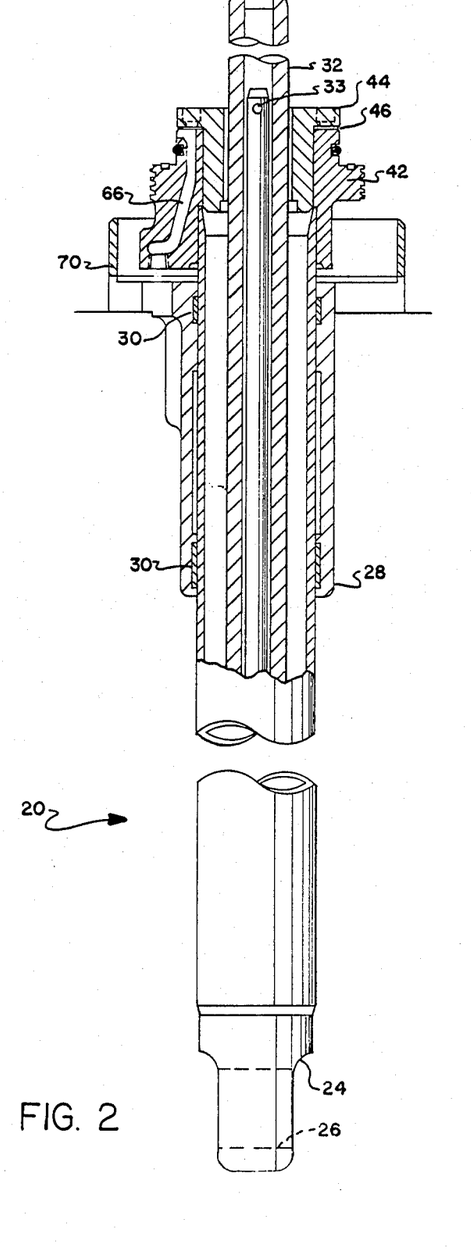
FIG. 2 is a vertical sectional view of the apparatus according to the first embodiment, taken along line 2—2 of FIG. 3.

Referring now to FIG. 2, hub 42 includes at least one and preferably two additional passageways 66 for sensing of conditions, particularly temperature, within the interior of bladder B. For example, a probe may be inserted through passageway 66 for determining temperature. Passageway 66 affords fluid communication between the interior of the tire press and the exterior of the device, and also provides a channel through which a sensing instrument probe may be inserted if desired. Passageways 66 are normally displaced by equal and opposite angles from outlet passageway 54. For example, in the specific embodiment shown, the displacement angle may be approximately 60°, although this is by no means critical. It is desirable to provide two passageways 66 instead of one, so that center mechanism 20 will be neither "right handed" nor "left handed", i.e., so that the inlet passageway 52 may be either to the left or to the right as most frequently viewed by workers, and a sensing passageway 66 will be toward the front of center mechanism 20, where it will be most readily accessible to workers.

The tire press is provided with a register ring 70 for centering of the tire mold.

Clamping rings 74 and 76 clamp the lower ring of bladder B in place. These rings are threadedly secured to hub 42.

Distribution cap 44 (see FIG. 4) comprises a vertical sleeve 78 and a flange 80 at the upper end of the sleeve. Sleeve 78 fits inside bore 48 of hub 42, and flange 80 rests on top of hub 42. Flange 80 has a passageway 82 along the lower edge of the flange which is aligned with inlet passageway 52 of hub 42. This passageway may terminate in a plurality of nozzle-like openings which open through the top of flange 80. Flange 80 also has a cutout portion (preferably three-sided as shown) 84 in alignment with the outlet passageway 54 of hub 42. Sleeve 78 has a cutout portion 86 at its lower end to provide communication between bore 48 and outlet passageway 54 of hub 42.

Figure 4:
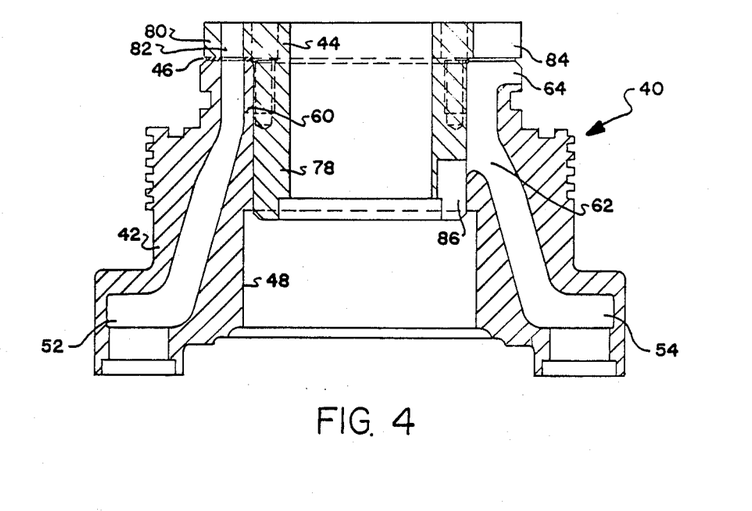
FIG. 4 is a vertical sectional view, taken along line 4—4 of FIG. 3, of a fluid distribution assembly comprising a hub, distribution cap and gasket, according to the first embodiment.

Gasket 46 is interposed between the top of hub 42 and the flange 80 of distribution cap 44 to prevent leakage between the hub and the distribution cap. Gasket 46 may be of a suitable resilient or elastomeric material. The gasket has a passageway and a cutout portion which are aligned with passageway 82 and a cutout portion 84, respectively, of distribution cap 44.

The center mechanism described herein can also be used when a liquid curing medium, such as hot water under high pressure, is used, but in that case it is desirable to make a minor structural modification. Specifically, one piece distribution cap 44 is replaced by two-piece distribution cap member, as will be more particularly described with reference to FIGS. 5–9. Hub 42 and gasket 46 are used without change. Thus, the annular fluid distribution member of the second embodiment comprises three pieces (not counting the sealing gasket 46) instead of two pieces as in the first embodiment. The second embodiment will be described with reference to FIGS. 5–9.

Figure 5:
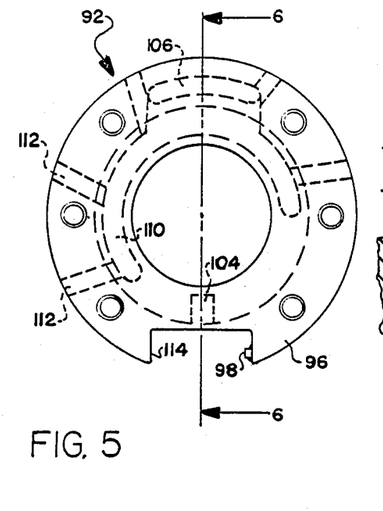
FIG. 5 is a top plan view of a fluid distribution assembly according to a second embodiment of the present invention, particularly suited for use of hot water as a curing medium.
Figure 6:
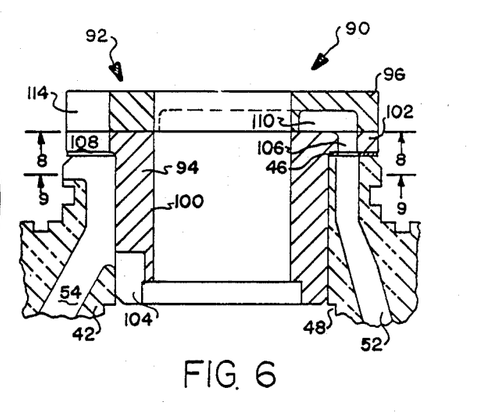
FIG. 6 is a vertical sectional view of the above mentioned fluid distribution assembly, taken along line 6—6 of FIG. 5.
Figure 7:
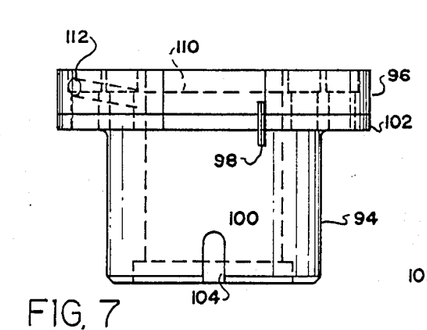
FIG. 7 is a side view, as seen from the outlet or drain side, of a distribution cap according to the second embodiment.

Referring now to FIGS. 5–9, the annular fluid distribution member 90 of the second embodiment of the invention comprises (from bottom to top) hub 42, gasket 46, and a two piece distribution cap 92 which in turn comprises a flanged sleeve 94 and a cylindrical top plate 96. A short vertical metallic bar 98, shown in FIG. 7, is welded to flanged sleeve 94 and top plate 96 to hold these two pieces together.

Flanged sleeve 94 comprises a sleeve portion 100, which is structurally similar to the sleeve portion 78 of distribution cap 44, and a flange portion 102 at the top of the sleeve portion, which flange portion is similar to the flange portion 80 of distribution cap 44 except that it is thinner. Thus, the sleeve 100 includes a cut-out portion 104 at its lower end, to afford communication between the bore of annular distribution member 90 and the outlet passageway 54 of hub 42. The flange structure (except for thickness) is likewise similar to the flange 80 of distribution cap 44. Thus, flange 42 includes arcuate slotted passageway 106 in alignment with inlet passageway 52 of hub 42, and a three-sided cut-out portion 108, with adjacent sides at right angles, in alignment with outlet passageway 54 of hub 42.

Figure 8:
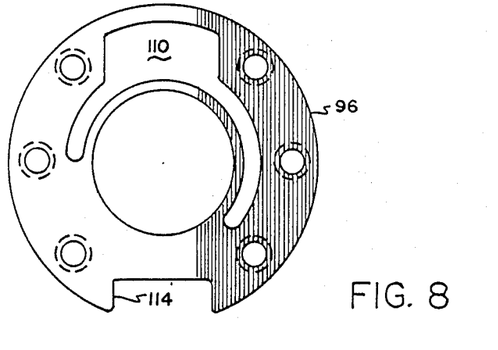
FIG. 8 is a bottom view of the top plate in the distributor cap of the second embodiment, as seen along line 8—8 of FIG. 7.
Figure 9:
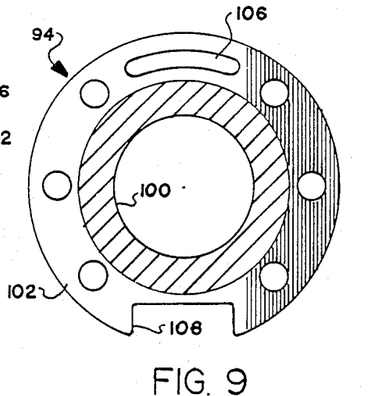
FIG. 9 is a sectional view, looking upwardly along line 9—9 of FIG. 8, of the distributor cap of the second embodiment.

The structure of top plate 96 differs somewhat from the structure of flange 80 of distribution cap 44. Top plate 96 includes an arcuate inlet channel 110, which communicates with the inlet passageway 106 of flanged sleeve 94 and extends through an arc of approximately 225°. A plurality of nozzles 112, directed laterally outwardly and upwardly at a slight angle, communicate with inlet channel 110 and provide for the discharge of hot water in a plurality of small streams into the interior space of bladder B. Thus, the liquid curing medium (e.g. hot water) is directed laterally outwardly in this embodiment, while the gaseous curing medium in the first embodiment is directed upwardly. Top plate 96 has a three-sided cut-out portion 114, whose sides are respectfully aligned with the sides of cut-out portion 108 in flange sleeve 94, to provide for draining of curing medium into the outlet passageway 54 of hub 42.

Various modifications can be made in the structures described herein without departing from the invention. Thus, the two-piece fluid distribution member 40 shown in FIGS. 1–4, and the three-piece fluid distribution member 90 shown in FIGS. 5–9, can be replaced by a single piece member, which may be formed by any desired means such as casting or molding. For convenience in fabrication, the two-piece distribution member 40 and a three-piece distribution member 90 are preferred. Other modifications can be made without departing from the invention. However, it is important in all cases to provide wall means between the inlet and the central passageway or bore of a fluid distribution member (also between the sensing passageway and the bore) in order to prevent cross flow of curing medium from the inlet to the outlet. Also, it is important to provide ready access from both the bore and the exterior of the fluid distribution member to the outlet passageway thereof, in order to permit efficient draining of fluid curing medium.

Figure 10:
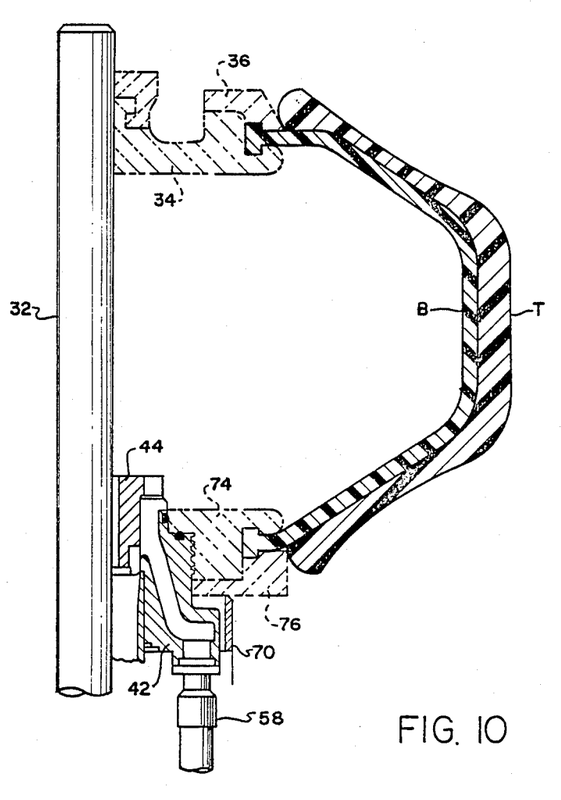
FIG. 10 is a diagramatic view of a portion of a tire press, showing schematically a center mechanism of this invention, a bladder and a green tire.

FIG. 10 shows a structure for clamping the upper end of bladder B. This structure comprises a pair of clamping rings 34 and 36, which are supported by the piston rod 32 at the upper end thereof. Rings 34 and 36 reciprocate with the piston rod. Bladder B may engage a green tire T. This structure may be conventional.

The present invention makes it possible to direct curing fluid in any desired direction into the interior of bladder B. Curing fluid is directed upwardly in the first embodiment (FIGS. 1–4) and laterally in the second embodiment (FIGS. 5–9). Of course, both embodiments also prevent crossflow of curing fluid to the outlet passageway (54 or 94) and to the bore 48 of hub 42 as already described.

In both embodiments of the invention, both the bore of hub 42 and the central passageway of the flanged sleeve 44 or 94 are of larger diameter than the outside diameter of the piston rod 32. This provides for freer circulation of curing medium between the interior of bladder B and the outlet 54 of hub 42.

Both the fluid distribution member 40 of FIGS. 1–6 and the fluid distribution member 90 of FIGS. 7–11, can be held together by bolts (as shown) or by other desired means.

Those portions of the center mechanism herein which have not been shown in detail, as for example the lower portion of casing 22, and the clamping ring structure for clamping the upper and lower beads of a bladder B, can be constructed according to means known in the art.

The operating cycle and curing conditions used in the tire press equipped with a center mechanism described herein may be conventional. Thus, for example, a green tire T may be inserted into a tire press or mold while the press is open and the piston rod 32 in its uppermost position. Then low pressure steam (or water) is introduced by a inlet passageway 52 into the interior of bag of bladder B, to inflate the bag and bring it into contact with green tire T, while the piston rod 32 is still in its uppermost position, as shown in FIG. 12. Then the press is closed, piston rod 32 moves downwardly, and high pressure steam (or water) at desired curing temperature and pressure (say for example about 400° F. and 100 psig) is admitted to the interior of bag B through inlet 52. After the desired time has elapsed, introduction of curing fluid ceases and an inert gas (say for example carbon dioxide, nitrogen or a mixture thereof) is introduced at very high pressure (say 300 to 400 psig) is scavenge or remove any residual curing fluid from the interior of bag B. Hot water may replace steam as the curing medium, in which case the carbon dioxide scavenging step is unnecessary. Then, as a tire press is being opened, the entire casing 22 is moved upwardly, as for example by the insertion of a suitable lifting tool into slot 26. This moves bottom clamping ring 74 and 76 away from the lower press or mold half. This permits unloading of the cured tire. Then the casing 22 is returned to its lowermost position, and piston rod 32 is moved by fluid pressure to its uppermost position and a new cycle is ready to begin. A suitable curing cycle is more fully described and illustrated in patent 3,976,409, and so details have not been given here.

Center mechanism of the present invention makes it possible to maintain virtually uniform temperature conditions throughout the tire press during curing. Thus for example, the temperature variation may amount to no more than about 1° F. (approximately 0.5° C.). This assures even curing of the tire. Also, curing medium is utilized more efficiently in presses equipped with a centering mechanism of this invention than in presses equipped with prior art centering mechanisms. Present invention also provides for efficient draining of curing medium. This improved circulation while curing is taking place, which in turn results in smaller temperature variations than those encountered in prior art devices. Also, present device allows for more efficient exhaustion of condensate at the end of a curing cycle. As the piston (not shown) and piston rod 32 are lifted preparatory to the beginning of a new curing cycle, in a condensate inside casing 22 is brought up with the piston and is exhausted through outlet passageway 54.

While this invention has been described with reference to preferred embodiments thereof, as shown in the accompanying drawings, it should be understood that these embodiments are by way of illustration and not by way of limitation.

What is claimed is:

1. A center mechanism for a tire press, said mechanism comprising:
   (a) an essentially vertical cylindrical casing having a rod reciprocable therein; and
   (b) an annular fluid distribution member at an upper end of said casing, said distribution member having:
      (1) a central bore extending vertically therethrough and surrounding a portion of said rod;
      (2) spaced inlet and outlet passageway means for a fluid curing medium extending therethrough, said passageway means being spaced from said bore;
      (3) imperforate wall means between said inlet passageway and said bore, said wall means extending the entire length of said bore for preventing cross flow of curing medium from said inlet passageway to said outlet passageway;
      (4) lateral passage means between said bore and said outlet passageway for permitting curing medium to flow from said bore to said outlet passageway; and
      (5) additional passageway means extending through said fluid distribution member for receipt of a sensor for permitting sensing of a condition within the tire press, said additional passageway means extending through said hub and comprising two passageways disposed at equal angles from and on opposite sides of said outlet passageway means, and in which said wall means prevents direct communication between the inlet passageway means and said additional passageway means.

2. A center mechanism for a tire press, said mechanism comprising:
   (a) an essentially vertical cylindrical casing having a rod reciprocable therein; and
   (b) an annular fluid distribution member at an upper end of said casing, said distribution member comprising an annular hub and an annular distribution cap;
   said hub including a central bore extending vertically therethrough and surrounding a portion of said rod, spaced inlet and outlet passageways for said curing medium, said inlet and outlet passageways being spaced from said bore and extending from a top surface to a bottom surface of said hub, imperforate wall means between said inlet passageway and said bore, said wall means extending the entire length of said bore for preventing cross flow of curing medium from said inlet passageway to said outlet passageway, and a lateral passageway extending from said bore to said outlet passageway;
   said distribution cap comprising a sleeve and a flange, said sleeve being insertable into said bore and being so constructed as to permit fluid communication between said bore and the lateral passageway in said hub, said flange resting on said top surface of said hub and having passageways communicating with the inlet and outlet passageways, respectively, of said hub; and
   a gasket interposed between the top surface of said hub and the flange of said distribution cap, said gasket having a central passageway aligned with said bore, an opening aligned with the inlet passageway of said hub, and a cut-out portion aligned with the outlet passageway of said hub.

3. A center mechanism for a tire press, said mechanism including:
   (a) an essentially vertical cylindrical casing having a rod reciprocable therein;
   (b) an annular fluid distribution member at an upper end of said casing, said distribution member comprising an annular hub having a top surface, and an annular distribution cap resting on top of said hub having a bottom surface which mates with the top surface of said hub, said hub and said distribution cap each having (1) an annular body portion and a central bore, (2) aligned inlet passage means and aligned outlet passageways for a curing medium extending through said body portion, said inlet passage means and outlet passageways being spaced from each other and from said bore and casing and extending from near said top surface to a bottom surface of said distribution member, and (3) imperforate wall means between said inlet passage means and said bore, said wall means extending the entire length of said bore, for preventing cross flow of curing medium from said inlet passage means to said bore or said outlet passageway; said distribution member further including a lateral passageway extending from said bore to said outlet passageways; and
   (c) a sealing gasket interposed between the top surface of said hub and the mating bottom surface of said distribution cap, said gasket having a central passageway aligned with said bore, an opening aligned with the inlet passage means of said hub and said distribution cap, and opening means aligned with the outlet passageways of said hub and said distribution cap.

4. A center mechanism according to claim 3 in which said cylindrical casing includes at a lower end thereof, an end cap having means for receiving a tool for simultaneously lifting said casing and said rod.

5. A center mechanism according to claim 3 in which said distribution cap comprises a sleeve and a flange, said sleeve being insertable into said bore and being so constructed as to permit fluid communication between said bore and the lateral passageway in said hub, said glange resting on the top surface of said hub and including the aforesaid inlet passage means and outlet passageway.

6. A center mechanism according to claim 5 in which said hub further includes a second lateral passageway extending from an exterior surface of the hub to the outlet passageway.

7. A center mechanism according to claim 5 in which said distributor cap has a cut-out portion near a lower edge of said sleeve thereof for providing fluid communication between said bore and said lateral passageway.

8. A center mechanism according to claim 5 in which said hub and said distribution cap are each single piece members.

9. A center mechanism according to claim 8 in which the inlet passage means and outlet passageway in said distribution cap are open at a top surface thereof.

10. A center mechanism according to claim 5 in which said hub is a single piece member and said distribution cap comprises two pieces disposed one above the other, the first including said sleeve and a flange resting on the top surface of said hub, the second piece being generally cylindrical and placed on a top surface of said first piece, and having a central opening aligned with an interior of said sleeve.

11. A center mechanism according to claim 10 in which the inlet passage means in said distribution cap terminates in a plurality of radially extending discharge ports which open through an outside surface of the distribution cap.

* * * * *